Feb. 9, 1932.   J. SACHS   1,843,932
ELECTRIC APPLIANCE INCLOSING CABINET
Filed June 8, 1927
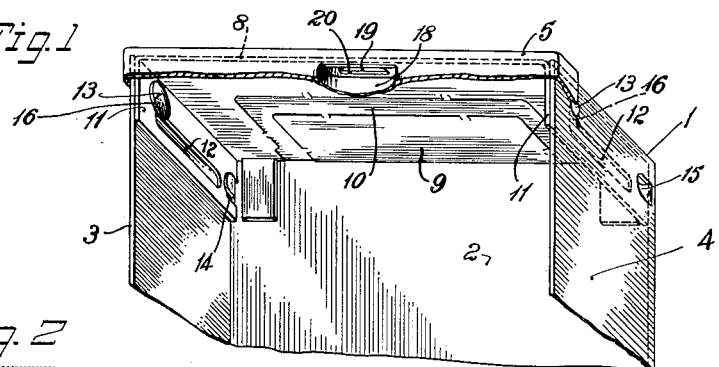
Inventor
Joseph Sachs
By S. Jay Teller
Attorney Patented Feb. 9, 1932

1,843,932

UNITED STATES PATENT OFFICE

JOSEPH SACHS, OF WEST HARTFORD, CONNECTICUT

ELECTRIC APPLIANCE INCLOSING CABINET

Application filed June 8, 1927. Serial No. 197,498.

The invention relates to a box or cabinet adapted for inclosing a current controlling appliance such as is commonly used for service entrance equipment in association with an electric meter. In an installation of this type one end wall of the cabinet, usually the upper wall, is constructed for direct protective association with an electric meter, being provided with or being adapted to be provided with an opening of such size as to receive and approximately fit at least a part of the terminal chamber portion of the meter. The cabinet thus serves not only to inclose and protect the appliance therein, but also serves to inclose and protect the terminal portion of the meter and the wiring connections extending between the appliance and the meter.

According to the prior practice the meter receiving end walls of boxes or cabinets of the type described were commonly made easily removable. One reason for providing easy removability was to enable the workman installing the meter to conveniently substitute one end wall for another. This was necessary in order that the end wall to be actually used might be adapted for use with the meter of the particular size and style to be installed. Another reason for providing easy removability was to enable the installing workman to get the end wall out of the way so that he could conveniently open the cover of the meter terminal chamber and so that he could make the necessary wiring connections between the meter and the appliance within the cabinet.

The need for the complete removability of the end walls to provide for different types and sizes of meters is becoming less urgent in view of the constantly increasing use of end walls each adapted for use with any one of two or more different sizes of styles of meters, and in view, further, of the fact that a great many meters now have their terminal chamber portions conforming to certain standardized dimensions. There remains, however, the necessity for facilitating the opening of the meter terminal chamber and the connection of the wires between the meter and the inclosed appliance. To this end the end wall may be permanently but movably connected with the other parts of the cabinet. With the end wall so connected it is no longer necessary for manufacturers, dealers and contractors to list or carry in stock end walls as separate articles of sale and use, and it is unnecessary for the installing workman to give any thought to the selection of the proper end walls for the particular installation to be made or to the provision of the necessary number of end walls. Furthermore, with the end wall permanently but removably connected with the other parts of the cabinet, it is impossible for the installing workman, through carelessness or inadvertence, to fail to install an end wall and thus leave the upper part of the cabinet entirely open.

The general object of the present invention is to provide an improved meter protecting cabinet of the type wherein the end wall is positively and permanently connected with the other parts of the cabinet but is nevertheless easily movably out of its normal position so as to conveniently permit the mounting of the meter and the connection of the meter wires. In accordance with the invention I provide an improved cabinet of the type described having the end wall sufficiently movable to meet all requirements of convenience but nevertheless forming a permanent part of the cabinet.

Further objects of the invention are to provide certain improved details of construction whereby the foregoing object is attained.

While I have referred to the positive and permanent connection of the end wall with the other parts of the cabinet it will be understood that I do not necessarily so limit myself as concerns certain phases of the invention. In some cases it may be sufficient to permit the required relative movements of the end wall, without however providing a completely permanent connection thereof.

In the accompanying drawings I have shown the embodiment of the invention which I now deem preferable but it is to be understood that the drawings are intended for illustrative purposes only and are not to be construed as defining or limiting the scope of the invention, the claims forming a part of this specification being relied upon for that purpose.

Of the drawings:

Figure 1 is a fragmentary perspective view showing the upper portion of a meter protecting cabinet embodying the invention.

Fig. 2 is a view similar to Fig. 1 omitting the cabinet cover and showing the end wall in its forward position.

Fig. 3 is another view similar to Fig. 1 but showing one of the knockouts in the end wall removed and showing a meter in position with the terminal chamber portion thereof extending through the knockout opening in the end wall.

Fig. 4 is a fragmentary central vertical sectional view of the cabinet as shown in Fig. 1.

Fig. 5 is a fragmentary sectional view taken along the line 5—5 of Fig. 4.

Fig. 6 is a fragmentary view similar to Fig. 1 but showing an alternate embodiment of the invention.

Referring to the drawings, 1 represents a box or cabinet adapted for inclosing an electric circuit controlling appliance. The appliance to be enclosed within the cabinet may be of any usual or preferred form, this appliance being omitted from the drawings, as it does not of itself form any part of the present invention. Except as hereinafter described the cabinet may be and preferably is of conventional construction, being formed of sheet metal with a back wall 2 and side walls 3 and 4. The cabinet is provided with an openable front cover 5 which may be hinged at 6 to the bottom wall 7 of the cabinet so as to be openable by forward and downward pivotal movement. The cover 5 is flanged at its edges in the usual way.

The upper end wall for the cabinet is shown at 8, this end wall being normally positioned perpendicularly to the said back wall 2 and the side walls 3 and 4 and engaging the said walls so as to substantially close the cabinet at the upper end. The end wall 5 is constructed for protective association with an electric meter, but I do not narrowly limit myself as concerns the exact details of construction which adapt it for such protective association. The end wall may be formed with a simple opening therein adapted to receive the terminal chamber portion of a meter; or it may be provided with a movable shutter or shutters for varying the effective size of an opening therein so as to accommodate any one of two or more meters of different sizes or styles, as disclosed in my copending applications for electric meter protecting cabinet, Serial No. 532,449, filed Jan. 28, 1922, for meter adapter, Serial No. 49,896, filed Aug. 13, 1925, and for electric meter protecting cabinet, Serial No. 159,584, filed Jan. 7, 1927; or it may be provided with one or more removable knockouts therein so that any one of them can be removed to provide the required meter opening as set forth in my application for box for inclosing electrical appurtenances, Serial No. 578,342, filed July 29, 1922. It will be understood that in so far as the present invention is concerned it is primarily essential, as already stated, that the end wall be constructed for protective association with an electric meter and that the exact details whereby this result is obtained are of secondary importance. However, I prefer and have shown the end wall 8 provided with knockouts therein as set forth in my aforesaid application Serial No. 578,342. In Fig. 1 of the drawings, I have illustrated two knockouts 9 and 10, these knockouts when in place serving in cooperation with the main body of the end wall to entirely close the upper end of the cabinet. It will be understood that the knockout 9 can be removed to adapt the end wall for protective association with a meter of one size or that the knockout 10 can be removed to adapt the end wall for protective association with a meter of another size.

I provide means for positively connecting the end wall with the side walls of the cabinet. The said means is so constructed and arranged as to permit the end wall as an entirety to be moved out of its normal cabinet closing position and out of engagement with the back wall 2, remaining, however, positively connected with both of the said side walls. The movement of the end wall out of its normal position may be a simple bodily movement in the forward direction or it may be a pivotal or angular movement. It is obvious that either a simple forward movement or a pivotal movement would carry the end wall away from the back wall and would thus provide the required space for the convenient connection of the wires extending from the meter to the appliance within the cabinet.

While, as already stated, the desired result may be obtained by a simple forward movement or by a pivotal movement, I prefer to so construct the connecting means that the said end wall can have both of these movements either simultaneously or in succession. With the construction shown the end wall can be first moved bodily forward and then moved angularly about a transverse pivotal axis to any desired position. By fall lines in Fig. 2 I have shown the end wall approximately parallel to the back wall 2, but it may occupy other positions as for instance that shown by dotted lines in Fig. 2.

The details of the connection between the end wall and the side walls can be varied but preferably and as shown the end wall is provided with flanges 11, 11. A connecting means is provided between each flange and the adjacent side wall, one of the said members being slotted for this purpose and the other member carrying a retaining element which projects into the slot. As shown in Figs. 1 to 5 the slots are in the flanges 11, 11 being shown at 12, 12 and the retaining elements are carried by the side walls, 3 and 4, being shown at 13, 13. The slots are closed at their ends. It is obvious that with this construction the end wall can be moved bodily forward within the limit permitted by the slots 12 and after being so moved can be moved angularly about the axis of the elements 13, 13 which thus serve as pivots. The pivotal movement may be upward or downward, but I have illustrated the end wall as moved downward to a position approximately parallel with the rear wall. The slots 12, 12 permit the foregoing movements to be effective while the side walls 3 and 4 remain in their normal unflexed positions.

When it is desired to connect the end wall not only positively but also permanently with the side walls, each retaining element 13 may be in the form of a rivet permanently connected with the corresponding side wall and having a large head which engages the inner face of the corresponding flange 11. The heads on the elements 13, 13 prevent any outward flexing of the side walls to release the end wall.

Preferably in order that the end wall 8 may be normally held against pivotal movement I provide releasable locking means which normally engage the end wall and hold it against movement upward or downward away from the position shown in Fig. 1. As illustrated each flange 11 of the end wall is provided with a notch 14 near its rearward end and each side wall 3 and 4 is provided with an inward extending locking means or tongue 15 which normally projects into the notch 14 and serves to hold the end wall as already stated. It will be clear from an inspection of the drawings that when the end wall is moved bodily forward, as already described, the locking means is released inasmuch as the flanges with the notches 14 are thus moved away from the tongue 15. The said locking means are controlled and prevented from being released by means of the cover 5 when the cover is closed, it being obvious that the locking means can be released only by moving the end wall forward and that the cover when in closed position prevents such forward movement.

Preferably in addition to the releasable locking means already described, which normally prevent upward or downward pivotal movement of the rear portion of the end wall, I also provide other locking means which normally prevent forward movement of the end wall. Preferably this latter locking means is also controlled by the cover, forward movement of the end wall being permitted when the cover is open and being prevented when the cover is closed. Preferably and as shown, a notch 16 is provided at one edge, preferably the upper edge, of each of the slots 12 at or near the front thereof, the construction being such that the corresponding pivot element 13 can be entered in the notch 16 by moving the forward portion of the end wall vertically. As shown in Fig. 1, the pivot elements 13, 13 are entered in the notches 16, 16 as described and the end wall is thus prevented from being removed forward. The end wall can be released for forward movement only by being first moved upward at the forward end, and when the cover 5 is in closed position this upward movement is prevented by the flange at the top of the cover. It will therefore be clear that the locking means can be released only by first opening the cover.

From the foregoing description it will be apparent that when the cover 5 is open the end wall 8 may be released for forward movement by raising the forward end thereof sufficiently to withdraw the edges of the notches 16, 16 from engagement with the pivot elements 13, 13. The end wall can then be moved bodily forward, this bodily forward movement withdrawing the edges of the notches 14, 14 from engagement with the tongues 15, 15. The end wall can then be swung forward and downward to the position shown in Fig. 2.

From an inspection of Fig. 2 it will be clear that the relative positions of the pivot elements 13, 13 are such that when the end wall is in its forward position the normally rearward position 17 thereof projects upward beyond the upper end of the side walls and into the path of the top flange of the cover 5. Obviously, therefore, the end wall when in this position serves to prevent the closing of the cover. This construction makes it impossible for the installing workman to inadvertently close the cover with the end wall in its forward position and thus lose the required protection.

A suitable means is provided for holding the cover 5 in its closed position. If desired the usual latch may be provided for this purpose, but I have shown the cover 5 as having a depression 18 therein with a slot 19 in the flange adjacent the depression. A corresponding slot 20 is formed in the end wall. It will be obvious that a sealing wire can be inserted through the slots 19 and 20 to seal the cover in closed position, a seal S being provided for this purpose. It is obvious that, inasmuch as the cover when closed prevents removal of the end wall, the connecting of the cover to the end wall is entirely effective for holding the cover closed.

It frequently happens that the cabinet with the circuit controlling appliance enclosed therein is installed before the meter is installed and in such a case it is desirable to keep the upper end of the cabinet entirely closed in order to exclude dirt and to prevent tampering with the enclosed appliance. In order to accomplish this the end wall is allowed to remain as illustrated in Fig. 1 with the knockouts in place.

When a meter such as M is to be installed the cover 5 is first opened and then the end wall is drawn forward and swung upward or downward as already described preferably downward, so that it occupies the position shown in Fig. 2. With the end wall in this position the workman can conveniently remove either the knockout 9 or the knockout 10 as may be required to accommodate the particular meter to be installed; or when other end wall constructions are used he can make any required adjustments. The meter M is then put in place on the supporting wall or panel and the usual electrical connections are made between the meter and the appliance within the cabinet. It will be obvious that the opening provided by the removal of the knockout 9 or the knockout 10 enables the workman to more conveniently see the terminal portion of the meter and to more conveniently make the required connection.

After the meter has been installed and connected as described the end wall can be swung upward and then moved backward into its original position where it will be protectively associated with the meter as clearly shown in Fig. 3. Then the cover is closed and sealed.

In Fig. 6 I have illustrated the fact that, if preferred, the retaining elements and the slots may be reversed from the positions already shown and described. In this figure there is shown a slot 12ª in the side wall 4ª and a retaining element 13ª carried by the corresponding flange 11ª of the end wall. With this construction the notches 14 and the tongue 15 are omitted as are also the notches 16. Inward projecting lugs as indicated at 21 may be provided for preventing downward pivotal movement of the end wall when in its rearward position, upward pivotal movement being prevented by the flange on the cover when the cover is closed. A latch 22 is provided for holding the cover in closed position and it will be obvious that when the cover is thus held by the latch the end wall is prevented from being moved forward.

What I claim is:

1. In an electric meter protecting cabinet adapted for enclosing a current controlling appliance, the combination with the back and side walls of the cabinet, of an end wall constructed for protective association with an electric meter and normally positioned perpendicularly to the said back and side walls so as to substantially close the cabinet at one end, flanges on the end wall positioned adjacent the respective side walls, one of the last said members being provided with slots therein perpendicular to the said back wall and being also provided with notches at the edges of the slots, and retaining elements carried by the other of the last said members and normally extending into the said notches to prevent forward movement of the end wall, the said retaining elements being adapted to leave the notches and enter the slots so as to permit the end wall as an entirety to be moved bodily forward from its normal position while remaining positively connected with the said side walls.

2. A cabinet as set forth in claim 1, wherein the retaining elements are carried in fixed positions on the side walls and wherein the slots and notches are in the flanges on the end wall, the said end wall being movable vertically to cause the retaining elements to leave the notches and enter the slots.

3. In an electric meter protecting cabinet adapted for enclosing a current controlling appliance, the combination with the back and side walls of the cabinet, of an end wall constructed for protective association with an electric meter and normally positioned perpendicularly to the said back and side walls so as to substantially close the cabinet at one end, the said end wall having flanges positioned adjacent the respective side walls and provided with longitudinal slots therein, with notches at the edges of the slots, and retaining elements carried by the said side walls near the front and extending into the said slots for positively connecting the said end wall with the said side walls, the said retaining elements normally permitting the end wall as an entirety to be moved bodily forward from its normal position while positively connected with the said side walls as aforesaid and the said retaining elements also being adapted to be entered in the said notches to prevent the bodily forward movement of the end wall, and an openable front cover for the cabinet serving in its closed position to hold the end wall in position with the retaining elements entered in the said notches as aforesaid.

4. In an electric meter protecting cabinet adapted for enclosing a current controlling appliance, the combination with the back and side walls of the cabinet, of an end wall constructed for protective association with an electric meter and normally positioned perpendicularly to the said back and side walls so as to substantially close the cabinet at one end, the said end wall having flanges positioned adjacent the respective side walls and provided with longitudinal slots therein, with notches at the edges of the slots, and retaining elements carried by the said side walls near the front and extending into the said slots for positively and permanently connecting the said end wall with the said side walls, the said retaining elements normally permitting the end wall as an entirety to be moved bodily forward from its normal position while positively and permanently connected with the said side walls as aforesaid and the said retaining elements also being adapted to be entered in the said notches to prevent the bodily forward movement of the end wall, an openable front cover for the cabinet serving in its closed position to hold the end wall in position with the retaining elements entered in the said notches as aforesaid, and means for locking the cover to the end wall to prevent opening of the cover.

5. In an electric meter protecting cabinet adapted for enclosing a current controlling appliance, the combination with the back and side walls of the cabinet, of an end wall constructed for protective association with an electric meter and normally positioned perpendicularly to the said back and side walls so as to substantially close the cabinet at one end, the said end wall having flanges positioned adjacent the respective side walls and provided with notches near their rearward ends, means having a pivotal axis near the front of the cabinet and serving to connect the said end wall with the said side walls so as to permit the end wall to be pivotally moved to a position at an angle to its normal position while remaining connected with the said side walls as aforesaid, and locking means on the said side walls adapted to enter the said notches in the flanges of the end walls and normally prevent the end wall from being pivotally moved in either direction.

6. A cabinet as set forth in claim 5, wherein the end wall is movable forward sufficiently to disengage the locking means from the notches and wherein there is a cover for the cabinet which when closed engages the end wall to prevent forward movement thereof.

7. In an electric meter protecting cabinet adapted for enclosing a current controlling appliance, the combination with the back and side walls of the cabinet, of an end wall constructed for protective association with an electric meter and normally positioned perpendicularly to the said back and side walls so as to substantially close the cabinet at one end, the said end wall having flanges positioned adjacent the respective side walls and provided with longitudinal slots therein and with notches at the edges of the slots, locking means normally engaging the end wall near the rearward end to prevent angular movement thereof, pivot elements carried by the said side walls near the front and extending into the said slots for positively connecting the said end wall with the said side walls, permitting the end wall to be moved bodily forward out of engagement with the said locking means and then moved angularly while positively connected with the said side walls as aforesaid, the said pivot elements being adapted to be entered in the said notches in the slots to prevent bodily forward movement of the end wall, and an openable front cover for the cabinet serving in its closed position to hold the end wall in position with the pivot elements entered in the said notches as aforesaid.

In testimony whereof I have hereunto set my hand this 3rd day of June, 1927.

JOSEPH SACHS.

CERTIFICATE OF CORRECTION.

Patent No. 1,843,932. Granted February 9, 1932, to

JOSEPH SACHS.

It is hereby certified that error appears in the printed specification of the above numbered patent requiring correction as follows: Page 5, line 59, claim 7, after the word "walls" strike out the comma and insert the words and for; and that the said Letters Patent should be read with this correction therein that the same may conform to the record of the case in the Patent Office.

Signed and sealed this 29th day of March, A. D. 1932.

(Seal)

M. J. Moore,
Acting Commissioner of Patents.